Patented Feb. 28, 1939

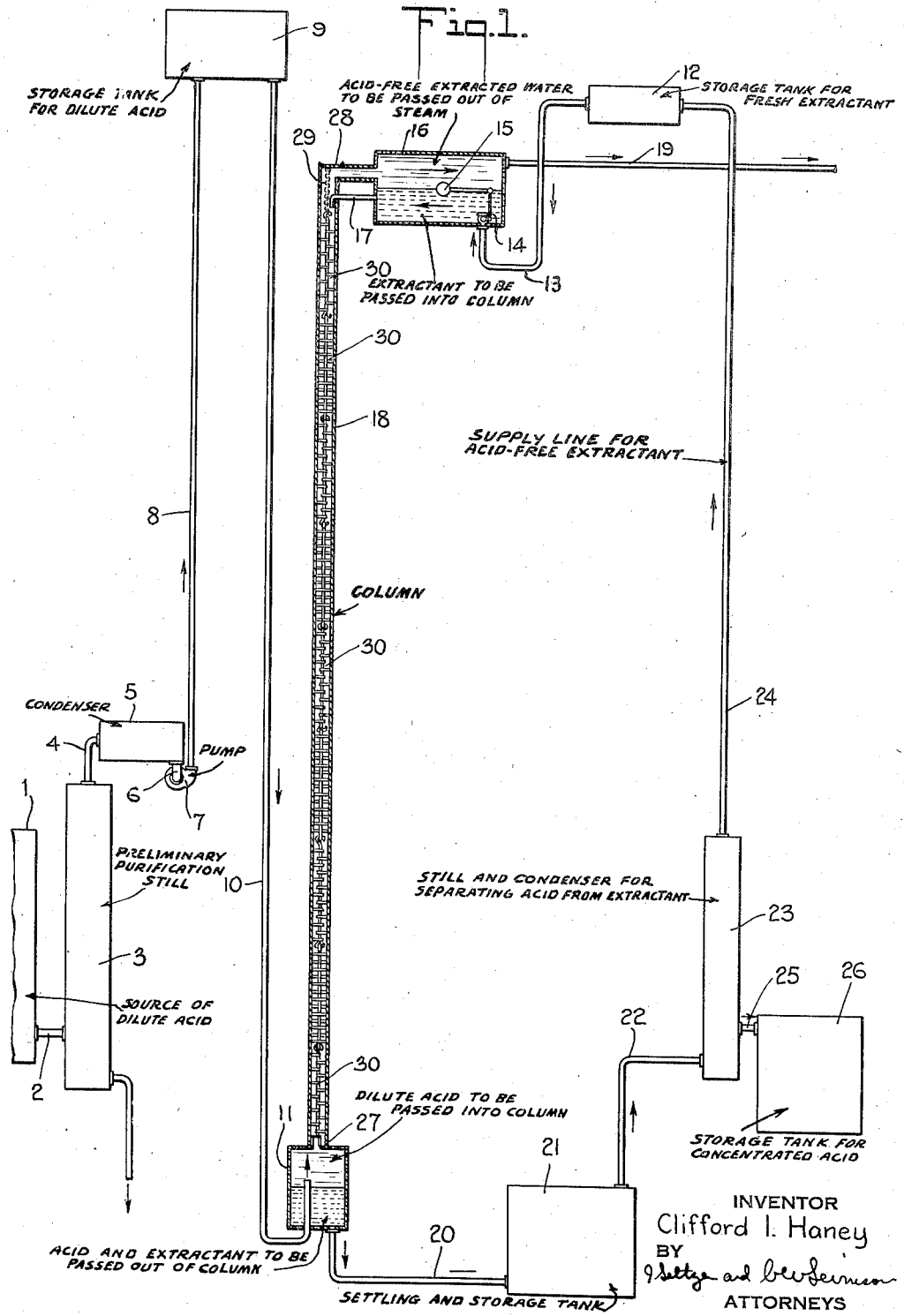

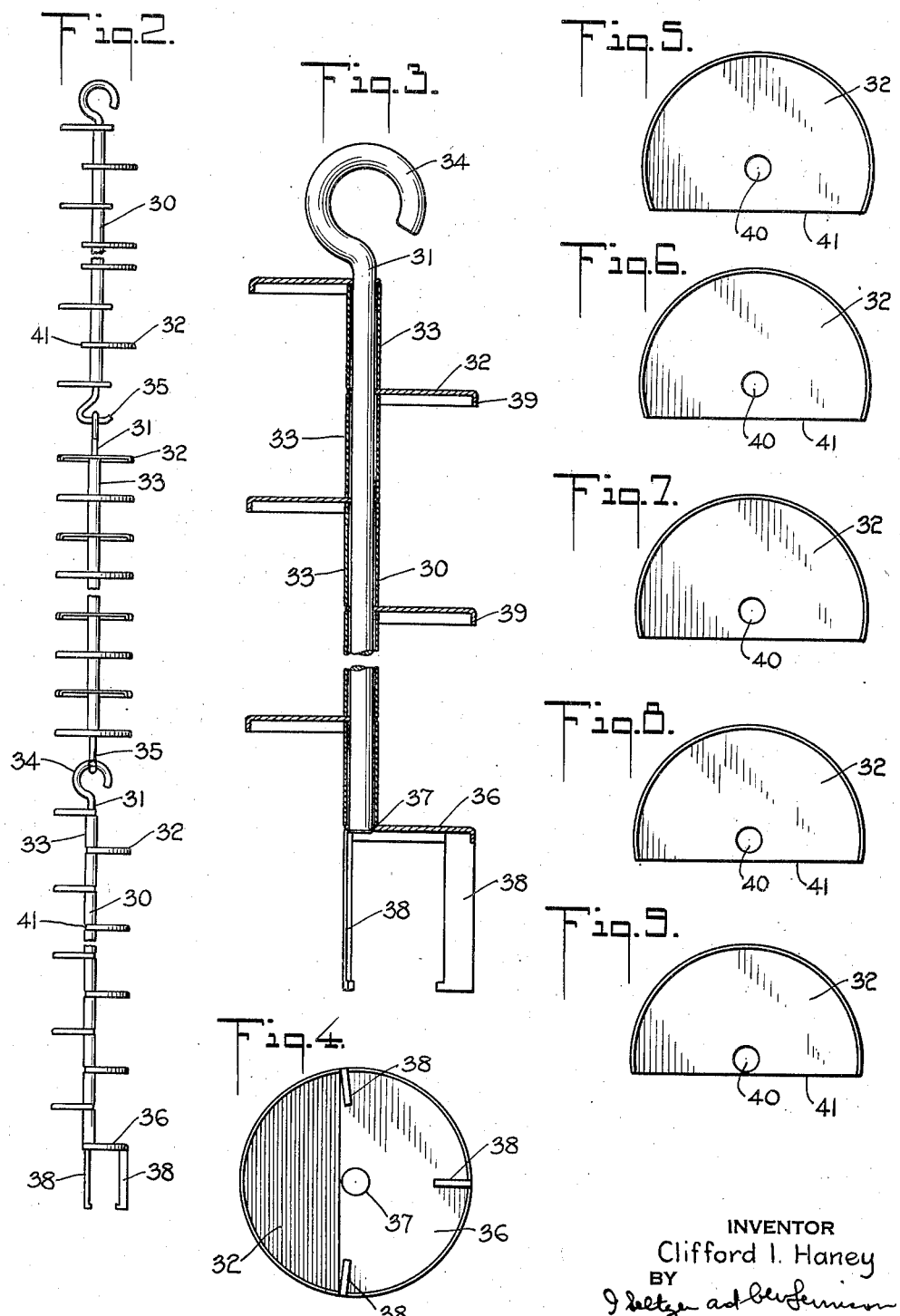

2,148,460

UNITED STATES PATENT OFFICE 2,148,460

CONCENTRATION OF ALIPHATIC COMPOUNDS

Clifford I. Haney, Drummondville, Quebec, Canada, assignor to Celanese Corporation of America, a corporation of Delaware Application October 5, 1934, Serial No. 747,084

6 Claims. (Cl. 23—270)

This invention relates to improvements in the method of concentrating aliphatic compounds from their aqueous solutions and more particularly the formation of glacial acetic acid and acetic anhydride from aqueous solutions of acetic acid and/or acetic anhydride as they come from a cellulose acetylating plant, from the pyrogenic decomposition of aliphatic acid plants and/or from a distillation plant of natural acetic acid.

An object of the invention is a method of and a device for economically and expeditiously removing impurities and water from solutions of the aliphatic acids by solvent or extractant methods. Another object of the invention is the construction of a device for the purification of aliphatic acids that allows for convenient removal of sludge, gums and solid matter deposited during the concentration of the acids and/or the dissolving of the acids in a solvent or extractant. Other objects of the invention will appear from the following detailed description and drawings.

In the drawings wherein like reference numerals refer to the same or similar elements in the various views:

Fig. 1 is a diagrammatic view of an acid recovery plant showing the separation column in comparatively more detail than the remaining parts.

Fig. 2 is a side elevation of sections of trays for use in the column shown in Fig. 1.

Fig. 3 is a side elevation of the lower or supporting section of trays shown in Fig. 2.

Fig. 4 is a view from the bottom of the section of trays shown in Fig. 3.

Figs. 5 through 9 show plan views of the trays adapted for the various sections of trays in the column shown in Fig. 1.

In concentrating aliphatic acids by the solvent or extraction methods, two major difficulties arise—first, that of continuously and intimately mixing the solvent or extractant with the solution originally containing the acid and second, the removal from the system of sludge that is formed by precipitation due to change in the mixture. The sludge comprises material which is soluble in a mixture of acid and water and which is not soluble in water alone or in mixtures of acid and the extractant for the acid. By this invention both of these difficulties are overcome and, further, a greater contact area and other advantages are gained which make for a substantially complete extraction of the acid.

Another advantage of this invention is that for the same size device with the same rate of flow there is left in the aqueous tailing 50% less acid than by former methods. By this invention, the acid is substantially or completely removed from the aqueous medium while the solvent or extractant increases, over prior methods, its concentration of dissolved acid, thereby greatly reducing the amount of solvent or extractant that must pass through the still for a unit volume of anhydrous or concentrated acid produced.

The device of this invention has the further advantage of being inexpensive in construction and easily cleaned by sludge and/or precipitate that is formed in such processes. The construction is such that an operating period, which is many times longer in duration than that obtainable by ordinary spray methods, may be had before the necessity for cleaning arises, and the high efficiency of the device is maintained throughout the long operating period. The construction of the device is such that metallic surfaces are self cleaning, always allowing for film contact with same.

In accordance with my invention, then, I concentrate aliphatic acids from their aqueous solutions by a counter flow acid solvent or extraction method wherein the acid to be extracted forms a film on metallic or other objects and is spread out transversely in the stream of solvent as a flare before it breaks into drops. Also, according to my invention, I provide a device causing intimate mixing of two counter flowing liquids without the same having to pass through small orifices and the like thereby eliminating clogging and also such that precipitates formed, even when they are of a sticky or gummy nature, may be readily removed from the elements of the device.

This invention is applicable to the recovery of aliphatic acid anhydrides and concentrated acid from the condensed vapors coming from the pyrogenic decomposition of aliphatic acids, which condensate comprises acid anhydrides, acid and water. As is known, this pyrogenic decomposition is carried out at high temperatures, for example, on the order of 500–900° C., with or without catalysts, and the mixture obtained, apart from the gaseous decomposition products, consists in the main of the acid anhydride, water and unchanged acid. According to the present invention, free water is separated from such a mixture.

This invention is also applicable to the separation of water and impurities from natural aqueous aliphatic acid solutions, such as those derived by distillation or fermentation of fruits, plants, etc. In this instance, a concentrated aliphatic acid is recovered.

The invention is particularly applicable, however, to the concentration and recovery of aliphatic acids from aqueous solutions of same coming from treating processes in the manufacture of artificial materials and especially artificial materials containing organic esters of cellulose, etc. In the preparation of cellulose esters, the aliphatic acids or their solutions may be used in pretreating the cellulose or in the reagent employed in esterifying the same and may also be formed from the acid anhydrides employed for the esterification of the cellulose. Ordinarily, the cellulose esters are separated from the solution formed during the esterification by the addition of water. The resulting aqueous solutions of the aliphatic acids are removed by distillation, decanting, washing, etc., from the cellulosic material, and these solutions may contain from 5 to 50% or more of the acid. In a plant with a large capacity this acid amounts to considerable quantities and many methods have been produced for the recovery of the same.

Although this invention is applicable to the separation of aliphatic acid anhydrides and/or concentrated acids from any aqueous solution of same, and by aliphatic acids is meant formic, acetic, butyric, propionic and the other acid members of the series, it will be described with particular reference to the recovery of concentrated acetic acid from aqueous solutions of said acid derived from the pretreatment of cellulose and the acetylation of cellulose in the manufacture of cellulose acetate.

The separation of the water from the acid may be accomplished with the aid of a solvent or extractant, for example methylene chloride or other suitable acid solvent or extractant that dissolves out the acid and forms a solution that separates from the water and/or the water solution. This separation may be effected by flowing the solvent or extractant through a column restricted in diameter counter current to the flow of aqueous solution. I have found that the aqueous solutions of the acid in the presence of a solvent for the acid form a film on any metallic, glass or other solid surface that they come in contact with. If there is enough surface to accommodate it, the water and acid associated therewith will pass through the system as a film on these surfaces while the solvent will be in the interstices. Depending on the rates of flow and due to this behavior a lay-out of interfaces may be formed, giving the highest rate of and most complete extraction.

In any type of set up and particularly the column here described, the best extraction results are obtained at about the fastest flows permissible in a system of restricted cross section, say 1 to 10 inches in diameter. The conditions for improved extraction are that the dilute acid and extractant pass one another at such a speed that any increase in speed produces a throttling effect. Thus, according to this invention, improved extraction results when the liquids are moving, in a small diameter column, at a speed just under that at which they both start holding up the other. Thus, a complete extraction of the acid may be effected by intimate contact of the extractant and dilute acid and maximum rates of flow in the extraction tube.

This intimate mixing and high speed of flow may be acquired in any suitable manner. A column may be formed of say 1 to 10 inch diameter or slightly larger and the same supplied with baffles, jets, etc., to cause a turbulent mixture of the extractant or a spray of droplets of one in the other, preferably with the liquids flowing counter current to each other. These columns may be several feet in length, say 5 to more than 30 feet, and may be mounted in a vertical position.

In the device shown in the drawings and forming a part of this invention, there is disclosed a preferred type of device for use in concentrating acids from their aqueous solutions. In the drawings, with particular reference to Fig. 1, there is diagrammatically shown a source 1 of dilute acid that may be the result of any number of processes. A line 2 leads from the source of supply to a heater or still 3 wherein about a 40% or stronger acetic acid solution in water is produced from the solution coming from the source of supply 1. This heater or still may be of any suitable form and consist of one or a series of units with storage tanks between the respective units and may include filters, pumps, etc. depending upon the type and origin of the aqueous solution of the acid. If the origin of the dilute acid is from the esterification of cellulose, the acid or heated acid solution may carry from this preliminary purification step a small amount of dissolved cellulosic products or cellulosic decomposition or hydrolization products that to remove from said solution would require elaborate and expensive plants and procedures. If the origin be from other processes, the solution of acid and water may contain other or similar soluble materials.

From the preliminary purification step which may be a filtering and/or distillation step, the solution of acid and water may be carried by a line 4 to a condenser and/or storage tank 5 that may be connected by a line 6 to a pump 7. A line 8, leading from the pump 7 to an overhead tank 9, may be provided to carry the aqueous solution from the pump to the overhead tank 9 that may be located at an elevation to maintain a pressure head on the aqueous phase of the system. From the tank 9, a line 10 may connect in a sight jacket 11 such that the end of said line is substantially above the bottom of said sight jacket 11.

A tank 12 may be provided for holding and receiving fresh or circulated extractant. From the tank 12 a feed line 13, equipped with a float valve 14 having a float 15, may lead into a separation chamber 16. The chamber 16 may be of glass or metal equipped with sight glasses. The float 15 is preferably of a density and weight that it will sink in the lighter liquid and float on the heavier liquid. In this way the valve may be set such that a desired amount of extractant is fed to the system. From the tank 16 a line 17 located below the level of the float may be provided to carry the extractant liquid from the tank into a column 18. Another line 19 may be provided to carry off the lighter liquid. The line 19 is connected to the chamber 16 at a point above the float 15 in such a way that it carries off only the lighter liquid. Where the lighter liquid is the free water, the chamber allows for the separation and settling out therein of any acid carrying extractant that may have become atomized therein. The line 19 may lead to a drain or a still, a salting tank or other suitable place. The tailings leaving by line 19, in using a heavier than water extractant, may be water containing a slight amount of unextracted acid. These tailings may be heated to remove dissolved extractant and then run to waste or, if the acid values left are worth retaining, the tailings may be used as wash liquors in the earlier manufacturing cycle. Alternately, the residual acid in the tailings may be recovered as a salt by neutralizing the acid, or other suitable recovery processes may be employed.

A line 20 may lead from the bottom or near the bottom of sight glass or jacket 11 to a storage and settling tank 21 for removing the extractant with its dissolved acid from the two phase system. A line 22 may lead from the tank 21 to a still and condenser 23 wherein the extractant and concentrated acid are separated by distillation. The extractant substantially freed from acid may be pumped to the storage tank and/or condenser 12 through a line 24 while the concentrated acid may be carried from the still 23 to a storage tank 26 through a line 25. The type of still employed and the position of condensers, pipe lines, etc., will depend upon the acid extracted and the boiling point, etc., of the extractant. A line may be employed to carry concentrated acid from the tank 26 back to the plant or other suitable place. In place of or in connection with the stills, etc., there may be employed precipitating tanks, settling tanks, etc.

In the drawings on Fig. 1 the elements are merely diagrammatic and the same represents for the most part a flow sheet. In Fig. 1, therefore, the exact position and size of elements are not limitations but merely indicate the flow of the various liquids in an apparatus for concentrating an acid from its aqueous solution by means of an extractant or solvent heavier than water. For example, the concentration or extraction of acetic acid from its aqueous solution may be effected by employing methylene chloride as the solvent or extractant.

These elements are shown diagrammatically and are replaceable with any type, shape, internal construction and modification of elements adapted to perform the general functions ascribed to same. For example, any type of pre-purification system may be used and, in place of pumps, the same may be constructed to feed entirely by gravity. Further, any type of still, condenser, dephlegmator, etc., may be employed for separation of the concentrated acid from the extractant liquid. In employing extractants that are lighter than water, the system of flow may be reversed with suitable changes in pressure heads, etc., and valves may be inserted in any of the lines for regulating or eliminating the flow of all or any of the liquids. Obviously drains and suitable storage tanks may be provided for cleaning and/or repairing part or all of the system.

The extracting column which forms a part of this invention will be described in more detail with particular reference to Figs. 2 to 9. The column 18 which may be from 1 to about 10 inches or more in diameter and from 5 to over 30 feet in length may be equipped with flanges 27 at its lower end and a removable trap door or section 28 at its upper end. The upper end may be provided with a chain 29 suitably fastened thereto that is adapted to support a plurality of sections of trays, each section being indicated by reference numeral 30.

A section of trays may be made by positioning on a suitable rod 31 a series of trays 32 say from 6 to 20 in number held spaced apart by spacer members or tubes 33. A column may be filled through its entire length by these sections, and from 5 to 40 sections may be employed in a tube. The trays may be set any suitable distance apart and are of a general diameter to be in sliding engagement with the inner walls of the column. It is preferable to have the trays spaced from each other a distance about equal to ½ their diameter.

Each of the rods forming a section may be formed with its upper end shaped to form an eye 34. Each of the rods 31, except the lowermost rod in the column, may have its lower end shaped to a hook 35 for engagement with the eye of the next lower rod. By means of the eye 34 the set of sections may be attached to the chain or other fastening means 29 for connecting them to the top of the column. The tray 36 of the lowermost rod may be welded or otherwise positively fastened to the rod as at 37. Fastened to or formed integral with the lowermost tray are spacing legs 38 to prevent the tray from resting on the opening in the bottom of the column.

The trays 32 are preferably flat circular trays having a narrow rim 39 for sliding engagement with the walls of the column, and a central hole 40 for threading upon the rods 31. A cut back 41 or secant is cut from the trays to allow liquids to pass through the pipes or the trays may be stamped to such a shape during their formation. The trays at the top of the column may have a smaller cut back than the trays at the bottom of the column. Thus the trays at the top of the column may have a cut back 41 considerably spaced from the centre 40 as shown in Fig. 5 as compared with the distance of the cut back 41 from the centre 40 of the trays at the bottom of the column as shown in Fig. 9. For example, in a 9 section column, the trays of the first or lowermost two sections may be of the general shape shown in Fig. 9, while those of the third and fourth sections may be like those shown in Fig. 8 those of the fifth section like Fig. 7, those of the sixth and seventh sections like Fig. 6 and those of the eighth and ninth sections like Fig. 5. The trays on each section may be the same or each tray may have a different cut back such that the passage through the column becomes gradually more restricted from bottom to top. This stepping back of the trays is desirable as the volume of acid liquor going up the column decreases as the acid is extracted. When the device is working, the acid film under the tray is met at the tray edge by the descending solvent or extractant. This causes the film to spread out horizontally in the tube, for example, in a 4 inch tube for about one inch, from the tray edge before it breaks into drops. The acid film under the tray tends to keep that surface free of deposits of gummy material, thus lengthening the operating period. The flare or spray of film caused by the edge 41 of the trays allows free contact to both sides of the film, thereby giving rise to a thorough extraction of the acid.

This tray arrangement is not subject to blockage by sludge and, if any sludge is accumulated, the trays can be easily pulled out from the column and cleaned. In reclaiming acetic acid from the dilute acid coming from a cellulose acetate plant, there is deposited a sludge and/or a precipitate in the column, of material comprising the decomposed and/or degraded cellulosic products, etc., that is soluble in the dilute acid and passes through filters and through the distillation steps yet which is not readily soluble in the solution of concentrated acid and extractant or the water tailings. This deposit of sludge greatly reduces the efficiency of systems having small passages. However, a considerable quantity of sludge may be deposited on the trays of the device of this invention before any appreciable lowering of its efficiency is noticed. The film of acid on the under side of the trays also aids in keeping the system efficient for long periods of time. Depending on the densities of the various components, the sludge or precipitate also tends to work to the bottom or top of the column where it can be collected and removed without causing the system to be shut down.

The number of columns and their size will be dependent somewhat upon the type and nature of the acid being recovered with its included materials and upon the type and particular solvent or extractant employed as well as the properties of said solvent or extractant with respect to those of the dilute acid. In using extractants lighter in weight than the dilute acid, such as ethyl ether and petroleum ether mixtures, the trays in the columns and/or the columns and flow of liquids may be reversed in an obvious manner. The columns may be of any suitable shape in cross section, for example, circular, square, elliptical, etc. The various parts of the device may be formed of any suitable material, for example, glass, stainless steel, bronze, etc.

Any type of extractant, for example, methylene chloride, ethylene chloride, ether, mixtures of kerosene, benzol, etc. with ethyl ether, ethyl acetate, chloroform, acetone oil, etc., ethers of phenols, or other suitable extractants may be employed.

As an illustration and not as a limitation, the following example is given.

*Example*

Dilute acetic acid, from a cellulose acetate acetylating plant, is allowed to settle in a tank, or the same may be filtered, and is caused to flow counter current to a stream of methylene chloride through a tube or column, about 20 ft. high and 3½ inches inside diameter fitted with approximately 120 trays, at a speed such that any increase will cause a choking of the liquids. The dilute acid entering the column contains approximately 40% acid in water. The water tailings contain less than 5% acid in water. The methylene chloride with its extracted acid is passed to a still and separated, the extractant returning to the system, while the acid is found to be concentrated.

It is to be understood that the above description and drawings are given by way of illustration and many alterations may be made therein without departing from the spirit of my invention.

Having described my invention, what I desire to secure by Letters Patent is:

1. In a device for concentrating aliphatic compounds by extraction methods, a column and fixed imperforate tray-like members spaced along said column, part of the edges of said tray-like members being in sliding engagement with said column and the remaining part of the edges being spaced therefrom so as to leave a substantial opening between the edge and the column, said tray-like members being so arranged that the liquids pursue a tortuous course through the column.

2. In a device for concentrating aliphatic compounds by extraction methods, a column and fixed imperforate tray-like members spaced along said column, part of the edges of said tray-like members being in sliding engagement with said column and the remaining part of the edges being spaced therefrom so as to leave a substantial opening between the edge and said column, said tray-like members being so arranged that the liquids pursue a tortuous course through the column, and those at one end of said column being of larger area than those at the other end of said column.

3. In a device for concentrating aliphatic compounds by extraction methods, a column and fixed imperforate tray-like members spaced along said column, part of the edges of said tray-like members being in sliding engagement with the column and the remaining part of the edges being spaced therefrom so as to leave a substantial opening between the edge and the column, the tray-like members being so arranged that the liquids pursue a tortuous course through the column, and increasing progressively in area from one end of the column to the other.

4. In a device for concentrating aliphatic compounds by extraction methods, a column, a core comprising a plurality of rods connected end to end and suspended from the upper end of the column and fixed imperforate tray-like members mounted on the rods and spaced along the column, part of the edges of said tray-like members being in sliding engagement with the column and the remaining part of the edges being spaced therefrom so as to leave a substantial opening between the edge and the column, the tray-like members being so arranged that the liquids pursue a tortuous course through the column.

5. In a device for concentrating aliphatic compounds by extraction methods, a column, a core comprising a plurality of rods connected end to end and suspended from the upper end of the column and fixed imperforate tray-like members mounted on the rods and spaced along the column, part of the edges of said tray-like members being in sliding engagement with the column and the remaining part of the edges being spaced therefrom so as to leave a substantial opening between the edge and the column, the tray-like members being so arranged that the liquids pursue a tortuous course through the column, those at that end of the column at which the extractant enters being of larger area than those at the other end of the column.

6. In a device for concentrating aliphatic compounds by extraction methods, a column, a core comprising a plurality of rods connected end to end and suspended from the upper end of the column and fixed imperforate tray-like members mounted on the rods and spaced along the column, part of the edges of said tray-like members being in sliding engagement with the column and the remaining part of the edges being spaced therefrom so as to leave a substantial opening between the edge and the column, the tray-like members being so arranged that the liquids pursue a tortuous course through the column, and increasing progressively in area from the end at which the extractant emerges to that at which it enters the column.

CLIFFORD I. HANEY.